United States Patent Office 3,296,318
Patented Jan. 3, 1967

3,296,318
EXTRACTION OF ALCOHOL FOR ODOR BODY REMOVAL
Charles M. Starks, Ponca City, Okla., assignor to Continental Oil Company, Ponca City, Okla., a corporation of Delaware
No Drawing. Filed Aug. 7, 1963, Ser. No. 300,649
12 Claims. (Cl. 260—643)

This invention relates to removal of certain diols from admixture with certain monools. Particularly it relates to improving the alcohols obtained by the hydrolysis of the product of the oxidation of aluminum trialkyls with respect to the odor quality of sulfates produced therefrom.

It has been observed that aliphatic hydrocarbon monohydric alcohols frequently contain substantial amounts of aliphatic hydrocarbon dihydric alcohols of roughly the same boiling point or range. Since these two classes of alcohols have different physiological and chemical behaviors, it is desirable to separate the mixture. This has not been easy to do.

Recently a new commercial source of monohydric alcohols has appeared. The alcohols are the product of the hydrolysis of the product of oxygen and aluminum trialkyl. A commercial process of this type is described in Encyclopedia of Chemical Technology, Kirk-Othmer, Editors, vol. I, 2nd ed. (1963). It is stated these alcohols include by-products such as esters, ethers, acids and aldehydes.

Pure primary alcohols produce sulfates having a bland, innocuous odor, which odor is desired by the sulfate producers. Alcohol sulfates, both alkyl hydrogen sulfates and alkali metal sulfates, produced from these hydrolysis-oxidation products have a typical odor and degrees of unpleastantness. Recent work has established that much of the odor of aluminum alkyl product alcohols is caused by the presence of aliphatic hydrocarbon dihydric alcohols, as an impurity, in the alkanol mixture; these diols are converted by the sulfation operation to compounds having an intensely disagreeable odor; even tiny amounts of these diols result in highly odorous sulfate products.

An object of the invention is a process for separating certain diols from certain monools. A particular object is the separation of these diols when they are present in "impurity" amounts. A preferred object is the removal of odor-precursors from alcohols made from aluminum alkyl-oxygen reaction products, to improve the odor quality of sulfates made therefrom. Other objects will be apparent in the course of the detailed description of the invention.

Briefly, it has been discovered that aliphatic hydrocarbon dihydric alcohols having not more than about 12 carbon atoms (diols) can be removed from admixture with aliphatic hydrocarbon monohydric alcohols (monools) having at least 5 carbon atoms by liquid-liquid extraction with an aqueous solvent. The diol is dissolved into the solvent and is found in the aqueous extract phase. The aqueous solvent is either water or a water-organic liquid solution containing not more than about 40 volume percent of organic liquid, which organic liquid is either ethanol, methanol, propanol, acetone, methyl ethyl ketone, dimethylformamide or dioxane.

The aliphatic hydrocarbon monohydric alcohol, hereinafter referred to as monool, has at least 5 carbon atoms and may be a single alcohol, a number of isomers, or a mixture of alcohols having different carbon atom number. The monool may be described as a compound having only carbon and hydrogen atoms in addition to one hydroxy substituent. The monool may be saturated or unsaturated. The alkanols having 6–30 carbon atoms are a desirable charge to the process.

The process of the invention is especially beneficial to quality, for use as sulfates, of the alcohols produced by hydroylsis of the reaction product of oxygen and aluminum trialkyl. More commonly these are even carbon number, straight chain, saturated primary monohydric alcohols having at least 6 carbon atoms. While these alcohols are readily available up to about 30 carbon atom number, those used for sulfate production are below about 22 carbon atom number. Although products are available which include essentially only one carbon atom number alcohol, e.g., 1-hexanol, 1-octanol, 1-tetradecanol, it is customary to use mixtures of two or more alcohols. A common mixture includes alcohols having 6, 8 and 10 carbon atoms; another mixture includes 12 and 14 carbon atom alcohols; another mixture includes 16 and 18 carbon atom alcohols. In the case of these mixtures, usually some small amount of lower and higher carbon atom number alcohols are present; thus the 6–10 alcohol may include some 4 and/or 12 carbon atom number alcohol; the 12–14 alcohol may include some 10 and/or 16 carbon atom alcohol; the 16–18 alcohol may include some 14 and/or 20 and 22 carbon atom alcohols.

The aliphatic hydrocarbon dihydric alcohol, hereinafter referred to as diol, has not more than 12 carbon atoms. The upper limit is related to the solubility of the diol at the particular temperature of extraction. Diol includes a single diol, a number of isomers, a mixture of diols of different carbon atom number. The diol may be described as a compound having only carbon and hydrogen atoms in addition to two hydroxy substituents. The diol may be saturated or unsaturated. The alkandiols having 2–10 carbon atoms are a desirable charge to the process. The air-oxidation of 5-methylnonane gives a mixture of oxygenated hydrocarbons. They can be reduced to a mixture of alkanols, 80%, and alkandiols, 20%. This is a suitable charge to this process.

It has been observed that the alcohols derived from the oxidation of product of aluminum trialkyl include deleterious amounts of diol, specifically, hexanediol is associated with decanol; octandiol (ca. 250° C. B.P.) is associated with dodecanol (256° C. B.P.); decandiol is associated with tetradecanol. The diol impurity type and amount, is dependent on the distillation sharpness used in cutting up the broad range of alcohols produced via the hydrolysis-oxidation of aluminum trialkyl growth product.

It is to be understood other by-products are present as impurity in the alcohol. Some of these are removed by the liquid-liquid extraction process of the invention, to give an even better quality alcohol.

The solvent used in the liquid-liquid extraction process of this invention is water or an aqueous solution of one or more of certain organic liquids. The organic liquids have a relatively high solubility in water. These organic liquids are the lower boiling alkanols, i.e., methanol, ethanol and propanols, the lower boiling ketones, i.e., acetone and methyl ethyl ketone; dimethylformamide; and dioxane (diethylene oxide). The aqueous solvents are particularly suitable for use at the lower temperatures of operation.

It has been discovered that the extraction efficiency of the aqueous solvent reaches a plateau at about 40 volume percent of organic liquid content; in other words the solvent solution has about 60–100 volume percent of water and the remainder essentially only organic liquid. More usually the aqueous solvent has about 70–100 volume percent of water and about 30–0 (zero) volume percent of organic liquid. Preferably 80–100% of water is present and the remainder is essentially only organic liquid. Water is especially preferred. Another solution of especial preference is: methanol, 20–10% and water, 80–90%.

The extraction is liquid-liquid and may be carried out at any temperature whereat both the solvent and the alcohol charge are liquid—superatmospheric pressure operation may be necessary. In general the extraction temperatures range over 10°–200° C. Extraction efficiency tends to increase with increasing temperature. It is preferred to operate with water and the lower organic liquid content solutions, at about 75–150° C.

The extraction may be batch or continuous and may be carried out in any of the equipment and according to any of the procedures known to this art.

The extract phase containing the diol is separated from the alcohol phase, which is of decreased diol content. The solvent may be separated from the diol by distillation. When water is the solvent, and waste disposal is not a problem, the extract phase may be discarded, if no economic reason exists for recovery of the diol.

The alcohol phase contains some dissolved solvent. The solvent may be readily removed by fractional distillation, by selecting the solvent with reference to the boiling point of the monool.

The amount of solvent used is determined by a combination of diol to be extracted; the amount of diol to be extracted; the monool present; the temperature of extraction; the equipment and type of operation; and the type of solvent. All of these factors are considered in any liquid-liquid extraction and, therefore, the solvent requirement is a matter of ordinary skill of the art.

*Examples*

The process of the invention is illustrated by the extraction of 1,5-octandiol from 1-dodecanol. Tritiated 1,5-octandiol was added to pure 1-dodecanol in an amount of 0.3%. Here the tritium was all attached to carbon atoms. This is the typical amount of diol present in the higher alcohols obtained in accordance with the commercial process described in the hereinabove referred-to section of Encyclopedia of Chemical Technology. In each example equal volumes of solvent and alcohol were intermingled, at the temperature specified in Table 1, and then the phases were allowed to settle. Samples were taken from each phase and assayed for tritium content; octandiol content is proportional to tritium content. The distribution ratio was then calculated as: concentration of octandiol in the extract phase (aqueous phase) divided by octandiol content in the reffinate phase (alcohol phase). The larger the value of the ratio the more efficient the extraction. The results of Examples 1–17 are set out in Table 1.

TABELE 1.—DISTRIBUTION RATIO OF 1,5-OCTANDIOL BETWEEN 1-DODECANOL AND VARIOUS SOLVENTS

| Example No. | Temp., °C. | Solvent | Distribution Ratio [1] |
|---|---|---|---|
| 1 | 25 | Water | 0.46 |
| 2 | 50 | do | 0.45 |
| 3 | 75 | do | 0.61 |
| 4 | 98 | do | 0.84 |
| 5 | 25 | 30% Methanol [2] | 0.53 |
| 6 | 25 | 20% Methanol | 0.53 |
| 7 | 25 | 10% Methanol | 0.44 |
| 8 | 25 | 30% Acetone | 0.53 |
| 9 | 25 | 20% Acetone | 0.53 |
| 10 | 25 | 10% Acetone | 0.30 |
| 11 | 25 | 30% Dioxane | 0.53 |
| 12 | 25 | 20% Dioxane | 0.42 |
| 13 | 25 | 10% Dioxane | 0.37 |
| 14 | 25 | 30% Dimethylformamide | 0.53 |
| 15 | 25 | 20% Dimethylformamide | 0.56 |
| 16 | 25 | 10% Dimethylformamide | 0.46 |
| 17 | 25 | 5% Dimethylformamide | 0.32 |

[1] Distribution Ratio = Octandiol concentration in aqueous phase / Octandiol concentration in alcohol phase
[2] Volume percent organic liquid.

EXAMPLE 18

Four hundred milliliters of 1-dodecanol containing 0.3% tritiated 1,5-octandiol were continuously extracted with hot water by allowing the water (50 ml./minute) to fall through the stirred alcohol mixture. After various times a sample of the alcohol phase was withdrawn and assayed for octandiol content.

| Time elapsed (hours): | Percent octandiol in 1-dodecanol phase |
|---|---|
| 0.00 | 0.30 |
| 0.50 | 0.18 |
| 1.25 | 0.09 |
| 2.00 | 0.08 |
| 2.9 | 0.06 |
| 3.9 | 0.04 |
| 5.9 | 0.03 |
| 7.9 | 0.00 |

EXAMPLE 19

Two hundred and fifty milliliters of 1-dodecanol containing 0.3% tritiated 1,5-octandiol were successively extracted with ten 250-ml. portions of water containing 5% methanol. After each extraction, the 1-dodecanol layer was sampled and assayed for octandiol content.

| No. extraction: | Percent octandiol in 1-dodecanol phase |
|---|---|
| 0 | 0.30 |
| 1 | 0.18 |
| 2 | 0.12 |
| 3 | 0.08 |
| 4 | 0.05 |
| 5 | 0.04 |
| 6 | 0.02 |
| 7 | 0.02 |
| 8 | 0.01 |
| 9 | 0.00 |

*Sulfates*

Alcohol sulfates prepared from "raw" alcohol mixtures obtained by the hydrolysis reaction product of the reaction of oxygen and aluminum trialkyl growth product had typical strong odors.

Alcohol sulfates prepared from water and methanol-water extracted alcohols had a recognizable typical odor but definitely better odor quality.

Thus having described the invention, what is claimed is:

1. A process for the removal of diol from admixture with monool which process comprises:
   liquid-liquid extraction of a liquid mixture of an aliphatic hydrocarbon monohydric alcohol having 5 to 30 carbon atoms, as the predominant alcohol, and an aliphatic hydrocarbon dihydric alcohol having not more than about 12 carbon atoms;
   with an aqueous solvent having about 60–100 volume percent of water and the remainder essentially only organic liquid selected from the class consisting of ethanol, methanol, propanol, acetone, methyl ethyl ketone, dimethylformamide and dioxane
   under conditions of 10° to 200° C. and at least an equal volume of said solvent to obtain a solvent phase enriched in said dihydric alcohol and an alcohol phase of decreased content of said dihydric alcohol, and
   separating said phases.

2. The process of claim 1 wherein said solvent has about 80–100% of water and the remainder essentially only said organic liquid.

3. The process of claim 1 wherein said solvent is water.

4. The process of claim 1 wherein said dihydric alcohol is an alkandiol having 2–10 carbon atoms.

5. The process of claim 1 wherein said dihydric alcohol is octandiol.

6. A process for the improvement of the quality of alcohol for use in the production of alcohol sulfates which process comprises:

liquid-liquid extraction of a liquid alcohol having 6 to 30 carbon atoms and being the even-number, straight chain primary alcohol product of the hydrolysis of the reaction product of oxygen and aluminum trialkyl with an aqueous solvent consisting essentially only of about 70–100 volume percent water and the about 30–0 (zero) volume percent of a liquid selected from the class consisting of ethanol, methanol, propanol, acetone, methyl ethyl ketone, dimethylformamide and dioxane, at a temperature of about 10°–200° C. and at least an equal volume of said solvent to obtain a liquid solvent extract phase and a liquid alcohol phase separating said phases and recovering from said alcohol phase an alcohol of improved sulfation quality.

7. The process of claim 6 wherein said alcohol is essentially a mixture of 6–10 carbon atom alcohols.

8. The process of claim 6 wherein said alcohol is essentially a mixture of 12–14 carbon atom alcohols.

9. The process of claim 6 wherein said alcohol is essentially a mixture of 16–18 carbon atom alcohols.

10. The process of claim 6 wherein said solvent is water and said temperature is about 75°–150° C.

11. The process of claim 6 wherein said solvent is water, about 80–90 volume percent, and methanol, about 20–10 volume percent and said temperature is about 75°–150° C.

12. A process for improving the sulfation product quality of an alcohol which process comprises: liquid-liquid extraction of an alcohol having 6–30 carbon atoms, which alcohol is an even-numbered, straight chain primary alcohol product of the hydrolysis of the reaction product of oxygen and aluminum trialkyl with at least an equal volume of water at a temperature of about 75°–150° C., to obtain a liquid extract phase of water and odor-forming bodies and an alcohol raffinate phase; separating said phases; and recovering from said alcohol phase an alcohol of improved quality with respect to the odor of sulfate prepared therefrom.

References Cited by the Examiner
UNITED STATES PATENTS

| | | | |
|---|---|---|---|
| 2,461,220 | 2/1949 | Lorand | 260—637 |
| 3,087,954 | 4/1963 | McClaflin | 260—632 |
| 3,088,982 | 5/1963 | Feldman et al. | 260—637 |

LEON ZITVER, *Primary Examiner.*

J. E. EVANS, *Assistant Examiner.*